Patented Nov. 8, 1938

2,135,674

UNITED STATES PATENT OFFICE 2,135,674

PROCESS FOR THE MANUFACTURE OF HYDROCHLORIC ACID AND SODIUM SULPHATE

Hans Oehlert, Krefeld-Uerdingen, Germany, assignor to I. G. Farbenindustrie Aktiengesellschaft, Frankfort-on-the-Main, Germany No Drawing. Application January 30, 1937, Serial No. 123,149. In Germany February 5, 1936

3 Claims. (Cl. 23—121)

This invention relates to the manufacture of hydrochloric acid and sodium sulphate by the double decomposition of rock salt and sulphuric acid by heating.

In the known processes for the manufacture of hydrochloric acid and sodium sulphate by reacting sulphuric acid upon rock salt the components are caused to react by heating in sulphate ovens.

In accordance with the present invention the charge employed in this process, i. e., the quantities of the components caused to react per unit of time, can be increased considerably, when one or both of the reaction components is or are already heated prior to introduction into the reaction chamber to such a degree that the mixture of the components possesses a temperature of at least about 200° C. and preferably about 250 to about 400° C., the upper limit of temperature being only given by the decomposition point of the reaction components and the resistivity of the construction material.

The process of the present invention possesses the additional advantage that undesirable lump formation in the reaction product, which takes place when working in accordance with the known technique, is practically completely obviated. Furthermore, the process of the present invention renders it unnecessary to heat the reaction chamber as strongly as in the processes hitherto known and consequently the sulphate ovens are subjected to less rigorous treatment. Finally, in accordance with the present new process, an improved economy of heat is attained.

The following example illustrates the invention, without being restricted thereto:

Example

By means of a sulphate oven, which handles, in accordance with the known process, hourly charges of 350 kgs. of rock salt and 300 kgs. of sulphuric acid, it is possible to attain, in accordance with the process of the present invention, a charge of 500 kgs. of rock salt and 430 kgs. of sulphuric acid when the rock salt is preheated to about 400° C. and the sulphuric acid to about 200° C. This preheating of the two components corresponds to a temperature of the mixture of about 275° C. The preheating of the rock salt is, with advantage, effected in a rotary tube furnace with direct or indirect heating.

I claim:

1. Process for the manufacture of hydrochloric acid and sodium sulphate by reacting with sulphuric acid upon rock salt which comprises heating at least one of the components prior to introduction into the reaction chamber to such a temperature that the reaction mixture possesses the temperature of at least about 200° C.

2. Process for the manufacture of hydrochloric acid and sodium sulphate by reacting with sulphuric acid upon rock salt which comprises heating at least one of the components prior to introduction into the reaction chamber to such a temperature that the reaction mixture possesses a temperature of about 250 to about 400° C.

3. Process for the manufacture of hydrochloric acid and sodium sulphate by reacting with sulphuric acid upon rock salt which comprises heating the rock salt prior to introduction into the reaction chamber to such a temperature that the reaction mixture possesses a temperature of about 250 to about 400° C., the preheating of the rock salt being effected in a rotary tube furnace.

HANS OEHLERT.